United States Patent Office 3,052,684
Patented Sept. 4, 1962

3,052,684
4-ARYL-4-ALKANOYLOXY-N-CYANO SUBSTITUTED PIPERIDINES
Franz Adickes and Karl Zeile, Ingelheim (Rhine), Germany, assignors to C. H. Boehringer Sohn, Ingelheim (Rhine), Germany, a limited partnership of Germany
No Drawing. Filed Nov. 10, 1960, Ser. No. 68,355
Claims priority, application Germany Nov. 13, 1959
9 Claims. (Cl. 260—294.3)

This invention relates to 4-aryl-4-alkanoyloxy-N-cyano substituted piperidines and non-toxic, pharmacologically acceptable acid addition salts thereof, as well as to various methods of preparing such compounds.

More particularly, the present invention relates to compounds having the structural formulas selected from the group consisting of $$N\equiv C-X-N\underset{R''}{\overset{R'}{\diagup}}\underset{\underset{O}{\overset{\|}{O-C-R}}}{Y} \quad (I)$$

and $$N\equiv C-C_mH_{2m}-A-C_nH_{2n}-N\underset{R''}{\overset{R'}{\diagup}}\underset{\underset{O}{\overset{\|}{O-C-R}}}{Y} \quad (Ia)$$

wherein R is lower alkyl,

R' and R'' are selected from the group consisting of hydrogen and lower alkyl,
X is a bivalent acyclic hydrocarbon with 4 to 10 carbon atoms, inclusive,
Y is aryl, especially phenyl,
A is selected from the group consisting of oxygen, sulfur, —NH— and —N (lower alkyl)—,
$m$ is an integer from 2 to 8, inclusive,
$n$ is an integer from 2 to 8, inclusive, and the sum of $m+n$ is an integer from 4 to 10, inclusive, and their non-toxic, phamacologically acceptable acid addition salts.

The compounds according to the present invention may be prepared by a number of known methods, but the following have been found to be especially suitable:

*Method A.*—Reaction of a 4-aryl-piperidinol-(4) of the formula $$HN\underset{R''}{\overset{R'}{\diagup}}\underset{OH}{Y} \quad (II)$$

with a halogenated cyano compound of the formula $$NC-X-Hal \quad (III)$$

or $$NC-C_mH_{2m}-A-C_nH_{2n}-Hal \quad (IIIa)$$

to form the corresponding 4-aryl-N-cyano-piperidinol-(4) of the formula $$NC-X-N\underset{R''}{\overset{R'}{\diagup}}\underset{OH}{Y} \quad (IV)$$

or $$NC-C_mH_{2m}-A-C_nH_{2n}-N\underset{R''}{\overset{R'}{\diagup}}\underset{OH}{Y} \quad (IVa)$$

and subsequent esterification of Compound IV or IVa with an organic acid chloride of the formula $$R-\overset{\overset{O}{\|}}{C}-Cl \quad (V)$$

or an organic acid anhydride of the formula $$R-\overset{\overset{O}{\|}}{C}-O-\overset{\overset{O}{\|}}{C}-R \quad (VI)$$

or a ketene of the formula $$(R)_2C=C=O \quad (VII)$$

to form the desired product of the Formula I or Ia. In Formulas II, III, IIIa, IV, IVa, V and VI the symbols R, R', R'', X, Y, A, $m$ and $n$ have the same meanings as defined in connection with Formula I and Hal is a halogen, preferably chlorine, bromine or iodine. In Formula VII R may represent hydrogen or lower alkyl. The reaction between the piperidinol II and the halogenated cyano Compound III or IIIa is preferably carried out at temperatures from 0 to 100° C., especially 40 to 80° C., and in the presence of a strongly polar solvent, such as acetonitrile or the like. The esterification of Compound IV or IVa with Compounds V, VI or VII is effected under customary esterification conditions in the presence of an inert organic solvent, such as chloroform or benzene.

*Method B.*—Reversal of the sequence of reactions described in Method A. In other words, a 4-aryl-4-alkanoyloxy-piperidine of the formula $$HN\underset{R''}{\overset{R'}{\diagup}}\underset{\underset{O}{\overset{\|}{O-C-R}}}{Y} \quad (VIII)$$

wherein the substituents R, R', R'' and Y have the same meanings as previously defined, is then reacted with the halogenated cyano Compound III or IIIa to form the desired product I or Ia. This method is particularly suitable if the halogenated cyano compound is very reactive due to the presence of unsaturated bonds, that is, if the bivalent radical X in Compound III is alkenylene or alkinylene, because the free 4-aryl-4-alkanoyloxy-piperidines VIII are very unstable and rather rapidly rearrange into the corresponding N-alkanoyl - 4 - aryl-piperidinols-(4). For this reason it is advantageous to react the 4-aryl-4-alkanoyloxy-piperidines not in the form of free bases, but rather in the form of their precipitates obtained with carbon dioxide at 0–5° C., with the halogenated alkenyl cyanides or halogenated alkinyl cyanides in polar solvents, such as acetonitrile, at temperatures from 0 to 30° C.

*Method C.*—Reaction of an aminoalkylcyanide with an acrylic acid alkyl ester, followed by internal ester condensation, hydrolysis and decarboxylation to form the corresponding N-cyanoalkyl-piperidone-(4), introduction of a phenyl radical into the piperidine ring with the aid of a phenyl-magnesium halide or phenyl lithium to obtain the corresponding N-cyanoalkyl-4-phenyl-piperidinol-(4), and esterification of the latter by customary methods.

*Method D.*—Reaction of a 4-aryl-piperidinol-(4) of the Formula II above with a molar excess of a dihalo hydrocarbon of the formula $$Hal-X-Hal \quad (IX)$$

wherein X is an acyclic hydrocarbon, preferably an alkylene radical with more than 6 carbon atoms (with shorter chain lengths there is a danger of undesirable ring formation at the nitrogen atom of the piperidinol) and Hal is a halogen, preferably chlorine, bromine or iodine, to form the corresponding N-haloalkyl-4-aryl-piperidinol-(4) of the formula

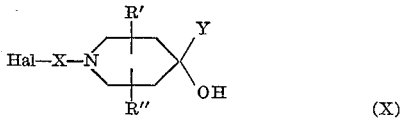

wherein Hal, X, R', R'' and Y have the meanings previously defined, and esterification of the N-substituted piperidinol X with Compounds V, VI or VII above to form Compound I.

The non-toxic acid addition salts of the basic Compounds I or Ia may be obtained by reacting the free bases with an inorganic or organic acid comprising a physiologically compatible anion, for example in ethereal solution, that is, by methods customarily employed for the preparation of acid addition salts of organic compounds comprising a basic nitrogen atom. Typical examples of such acids are hydrochloric acid, hydrobromic acid, sulfuric acid, nitric acid, methane sulfonic acid, tartaric acid, succinic acid, salicylic acid and the like.

The following examples will further illustrate the present invention and enable others to understand it more completely. However, it should be understood that the invention is not limited to these illustrative examples given below.

EXAMPLE I

*Preparation of N-6'-Cyanohexyl-4-Phenyl-4-Acetoxy-Piperidine and Its Hydrochloride by Method A*

A mixture of 10 gm. of 4-phenyl-piperidinol-(4) (0.056 mol), 15 cc. (0.1 mol) 6-cyano-hexylchloride (prepared from hexamethylene dichloride and potassium cyanide) and 80 cc. acetonitrile was heated for 24 hours at 60° C. Thereafter, the reaction mixture was allowed to cool, whereby the hydrochloride of 4-phenyl-piperidinol-(4) precipitated out (1.8 gm.). The precipitate was filtered off, the filtrate was evaporated to dryness in vacuo and the residue was shaken with a mixture of dilute aqueous hydrochloric acid and ether. The acid aqueous phase was separated from the ether phase, the aqueous phase was made alkaline with ammonia and was extracted with ether. The ether extract solution was dried over sodium sulfate and was then evaporated to dryness in vacuo, yielding 8.1 gm. of crystalline N-6'-cyanohexyl-4-phenyl-piperidinol-(4) (58.7% of theory, based on the amount of reacted 4-phenyl-piperidinol-(4)) of the formula

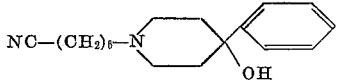

M.P. 88–90° C. after recrystallization from isobutyl acetate. The hydrochloride addition salt was obtained by passing dry hydrogen chloride through an ethereal solution of the free base. After recrystallization from butanone the hydrochloride had a melting point of 131–137° C.

5 gm. of the crystalline N-6'-cyanohexyl-4-phenyl-piperidinol-(4) were dissolved in 30 cc. chloroform and then ketene (CH₂=C=O) was bubbled through the solution for two hours. The reaction solution was evaporated to dryness and the residue, which was identified to be N-6'-cyanohexyl-4-phenyl-4-acetoxy-piperidine of the formula

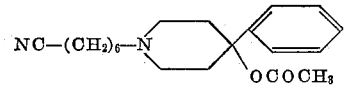

was dissolved in ether. Hydrogen chloride gas was passed through the ether solution, the ether was evaporated and the residue was recrystallized twice from butanone. 2.3 gm. (35.4% of theory) of N-6'-cyanohexyl-4-phenyl-4- acetoxy-piperidine hydrochloride were obtained. The salt had a melting point of 184–185° C.

EXAMPLE II

*Preparation of N-5'-Cyanopentyl-4-Phenyl-4-Acetoxy-Piperidine Hydrochloride by Method A*

A mixture consisting of 17.7 gm. (0.1 mol) of 4-phenyl-piperidinol-(4), 21.12 gm. (0.12 mol) of 5-cyanopentyl bromide (prepared from pentamethylene dibromide and potassium cyanide) and 80 cc. acetonitrile was heated for 24 hours at 60° C. Thereafter, the reaction mixture was worked up as described in Example I, yielding 20.4 gm. (about 75% of theory) of N-5'-cyanopentyl-4-phenyl-piperidinol-(4) of the formula

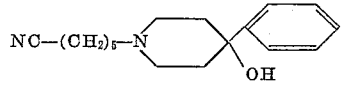

Its hydrochloride, prepared in the same manner as the hydrochloride of the cyanohexyl homolog of Example I, had a melting point of 109–112° C. after being recrystallized twice from acetone.

3 gm. of N-5'-cyanopentyl-4-phenyl-piperidinol-(4) were then esterified with ketene in a manner analogous to that described in the preceding example, yielding N-5'-cyanopentyl-4-phenyl-4-acetoxy-piperidine of the formula

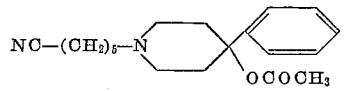

which was then converted into its hydrochloride with hydrogen chloride gas in ethereal solution. 0.9 gm. (23.3% of theory) of the hydrochloride was obtained. After digestion with acetone and recrystallization from butanone it had a melting point of 174–176° C.

EXAMPLE III

*Preparation of N-9'-Cyanononyl-4-Phenyl-4-Acetoxy-Piperidine Hydrochloride by Method A*

Using a procedure analogous to that described in Example I, 13.2 gm. (71.5% of theory) of crystalline N-9'-cyanononyl-4-phenyl-piperidinol-(4) of the formula

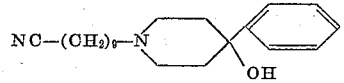

and its hydrochloride having a melting point of 134–137° C. were obtained from a mixture of 10 gm. (0.056 mol) 4-phenyl-piperidinol-(4), 15 gm. 9-cyanononyl bromide and 50 cc. acetonitrile.

Esterification of the free N-cyanononyl-phenyl-piperidinol with ketene yielded the corresponding acetoxy compound of the formula

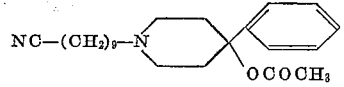

which was converted into its hydrochloride with hydrogen chloride, as described in the preceding examples. 27% of theory of N-9'-cyanononyl-4-phenyl-4-acetoxy-piperidine hydrochloride having a melting point of 186–187° C. after recrystallization from butanone were obtained.

EXAMPLE IV

*Preparation of N-8'-Cyanooctyl-4-Phenyl-4-Acetoxy-Piperidine Hydrochloride by Method A*

N-8'-cyanooctyl-4-phenyl-piperidinol-(4) having the structural formula

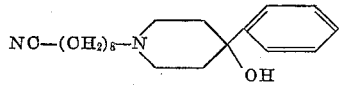

was prepared from 9-cyanooctyl bromide and 4-phenylpiperidinol-(4) by a procedure analogous to that described in Example I. Its hydrochloride had a melting point of 140–143° C. after recrystallization from acetone.

A mixture consisting of 3.15 gm. (0.01 mol) of N-8'-cyanooctyl-4-phenyl-piperidinol-(4), 7.8 gm. (0.1 mol) of acetyl chloride and 30 cc. benzene was refluxed for 1 hour. Thereafter, the reaction solution was allowed to cool, whereby a crystalline precipitate formed. The precipitate was separated and recrystallized from butanone. It was identified to be N-8'-cyanooctyl-4-phenyl-4-acetoxy-piperidine hydrochloride of the formula

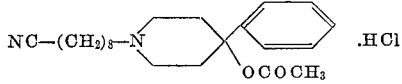

having a melting point of 179–182° C. The yield was 1.57 gm. (40% of theory).

EXAMPLE V

*Preparation of N-6'-Cyanohexyl-4-Phenyl-4-Propionoxy-Piperidine Hydrochloride by Method A*

Using a procedure analogous to that described in Example IV, N-6'-cyanohexyl-4-phenyl-4-propionoxy-piperidine hydrochloride of the formula

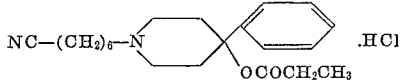

was prepared from N-6'-cyanohexyl-4-phenyl-piperidinol-(4) and propionyl chloride. After recrystallization from methyl acetate the product had a melting point of 138–141° C.

EXAMPLE VI

*Preparation of N-4'-Cyanobutyl-4-Phenyl-4-Acetoxy-Piperidine Hydrochloride by Method A*

Using a procedure analogous to that described in Example IV, N-4'-cyanobutyl-4-phenyl-4-acetoxy-piperidine hydrochloride of the formula

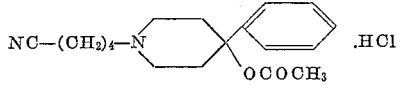

was prepared from N-4'-cyanobutyl-4-phenyl-piperidinol-(4) and acetyl chloride. After recrystallization from acetonitrile the product had a melting point of 178–181° C.

EXAMPLE VII

*Preparation of N-ω-Cyanobutoxybutyl-4-Phenyl-4-Acetoxy-Piperidine Hydrochloride by Method A*

Using a procedure analogous to that described in Example I, N-ω-cyanobutoxybutyl-piperidinol-(4) of the formula

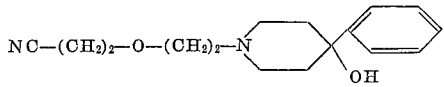

was prepared from 4-phenyl-piperidinol-(4) and ω-cyanobutoxybutyl bromide. The resulting product was then reacted with acetyl chloride in a manner analogous to that described in Example IV, yielding N-ω-cyanobutoxybutyl-4-phenyl-4-acetoxy-piperidine hydrochloride of the formula

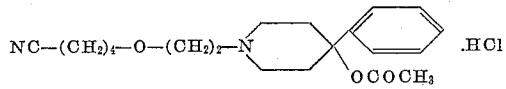

having a melting point of 167–170° C. after recrystallization from butanone.

EXAMPLE VIII

*Preparation of N-7'-Cyanoheptyl-4-Phenyl-4-Acetoxy-Piperidine Hydrochloride by Method A*

Using a procedure analogous to that described in Example IV, N-7'-cyanoheptyl-4-phenyl-4-acetoxy-piperidine hydrochloride of the formula

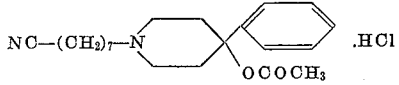

was prepared from N-7'-cyanoheptyl-4-phenyl-piperidinol-(4) and acetyl chloride. After recrystallization from a mixture of acetone and ether (1:1), the hydrochloride had a melting point of 151–154° C.

EXAMPLE IX

*Preparation of N-β-(β-Cyanoethyl-Mercaptyl)-Ethyl-4-Phenyl-4-Acetoxy-Piperidine Hydrochloride by Method A*

Using a procedure analogous to that described in Example IV, N-β-(β-cyanoethyl-mercaptyl)-ethyl-4-phenyl-piperidine hydrochloride of the formula

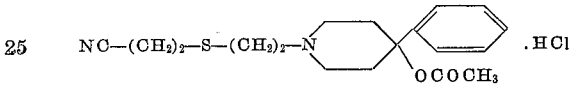

was prepared from N-β-(β-cyanoethyl-mercaptyl)-ethyl-4-phenyl-piperidinol of the formula

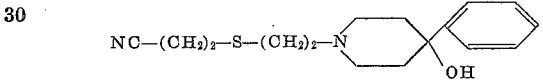

and acetyl chloride. After recrystallization from acetone the hydrochloride had a melting point of 166–169° C.

The N-substituted piperidinol starting compound was obtained by reacting 4-phenyl-piperidinol-(4) with β-(β-cyanoethyl-mercaptyl)-ethyl bromide in a manner analogous to that described in Example I.

EXAMPLE X

*Preparation of N-6'-Cyanohexyl-3-Methyl-4-Phenyl-4-Acetoxy-Piperidine Hydrochloride by Method A*

Using a procedure analogous to that described in Example I, N-6'-cyanohexyl-3-methyl-4-phenyl-piperidinol-(4) of the formula

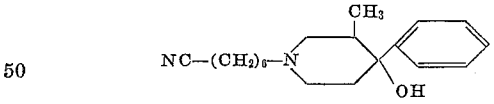

was prepared from 3-methyl-4-phenyl-piperidinol-(4) and 6-cyanohexyl bromide. The resulting product was then reacted with acetyl chloride in a manner analogous to that described in Example IV, yielding N-6'-cyanohexyl-3-methyl-4-phenyl-4-acetoxy-piperidine hydrochloride of the formula

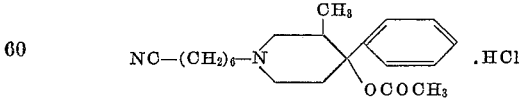

having a melting point of 176–180° C. after recrystallization from acetone.

EXAMPLE XI

*Preparation of N-7'-Cyanoheptyl-4-Phenyl-4-Acetoxy-Piperidine Hydrochloride by Method C*

31 gm. (0.1 mol) of N-8-cyanoheptylimino dipropionic acid dimethyl ester were stirred with 6 gm. (0.11 mol) of sodium methylate. The condensation reaction commenced after a short period of time, accompanied by evolution of heat. After the reaction had gone to completion, the reaction mixture was poured into 150 cc. of an aqueous 20% hydrochloric acid solution and the resulting mixture was refluxed for one hour. The reaction mixture was then concentrated in vacuo, the concentrate was neutralized with dilute sodium hydroxide and the neutralized mixture was extracted with ether. After evaporating the ether from the extract solution, about 80% of theory of raw N-7'-cyanoheptyl-piperidone-(4) of the formula

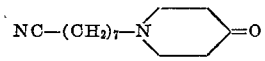

was obtained.

0.1 mol of this raw anhydrous N-substituted piperidone was dissolved in absolute ethyl ether. To this solution 0.2 mol of a benzene-magnesium-bromide Grignard reagent, prepared in customary fashion from 4.8 gm. magnesium shavings and 31.5 gm. bromobenzene in ether solution, was added drop-wise while maintaining the usual Grignard reaction conditions, and then the reaction was brought to completion by heating the reaction mixture under reflux for half an hour. Thereafter, the Grignard reaction mixture was worked up in the usual manner, yielding raw N-7'-cyanoheptyl-4-phenyl-piperidinol-(4) of the formula

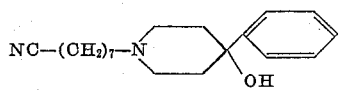

which was then esterified with acetyl chloride under conditions analogous to those described in Example IV. 40-50% of theory of N-7'-cyanoheptyl-4-phenyl-4-acetoxy-piperidine hydrochloride of the formula

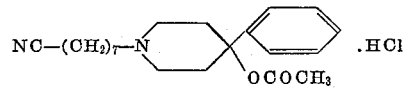

were obtained. After recrystallization from a mixture of acetone and ether (1:1) the product had a melting point of 151-154° C.

EXAMPLE XII

*Preparation of N-[4'-Cyanobutyn-2'-yl-1]-4-Phenyl-4-Propionoxy-Piperidine Hydrobromide by Method B*

27 gm. (0.1 mol) of 4-phenyl-4-propionoxy-piperidine hydrochloride of the formula

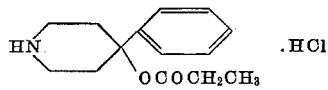

having a melting point of 173-174° C. after recrystallization from acetone, were dissolved in a small amount of water and, working as rapidly as possible, the solution was neutralized with dilute sodium hydroxide at 0° C., extracted with ether, and carbon dioxide was passed through the aqueous phase. The precipitate formed thereby was filtered off and taken up in acetonitrile. 15.8 gm. (0.1 mol) of 4-cyano-1-bromo-butyne-2 were added to the acetonitrile solution, and the resulting reaction mixture was allowed to stand for 24 hours at 10-20° C. About 35% of theory of N-[4'-cyanobutyn-2'-yl-1]-4-phenyl-4-propionoxy-piperidine hydrobromide of the formula

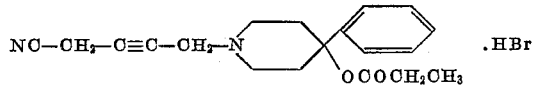

were obtained.

EXAMPLE XIII

*Preperation of N-10'-Cyanodecyl-4-Phenyl-4-Acetoxy-Piperidine Hydrochloride by Method D*

A solution of 150 gm. (0.5 mol) decamethylene dibromide in 300 cc. benzene was refluxed on a water bath for 4-5 hours and during that time a solution of 17.7 gm. (0.1 mol) of 4-phenyl-piperidinol-(4) in benzene was gradually added to the refluxing solution. After all of the 4-phenyl-piperidinol-(4) solution had been added, the resulting reacting mixture was refluxed for another two hours. Thereafter, the reaction mixture was allowed to cool, undissolved matter was separated by vacuum filtration, the benzene solvent and the excess decamethylene dibromide were removed from the filtrate by distillation in vacuo, the distillation residue was taken up in ether and the resulting ether solution was shaken with dilute hydrochloric acid. The aqueous acid phase was separated and discarded. The ether phase was neutralized with aqueous ammonia, dried over sodium sulfate, and the ether was evaporated in vacuo. The residue consisted of 31.3 gm. (79% of theory) of raw N-10'-bromodecyl-4-phenyl-piperidinol-(4) of the formula

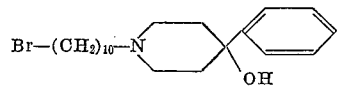

A sample of this base was dissolved in ether, and hydrogen chloride gas was bubbled through the solution. The N-10'-bromodecyl-4-phenyl-piperidinol-(4) hydrochloride which precipitated out was separated and recrystallized from butanone. It had a melting point of 119-121° C.

10 gm. (1/40 mol) of the free base were dissolved in 50 cc. ethanol and the resulting solution was admixed with a solution of 2.4 gm. sodium cyanide in 8 cc. water. This reaction mixture was refluxed for 3 hours. Thereafter, the ethanol was distilled off in vacuo, the residue was taken up in ether and the ether solution was shaken with water. The aqueous phase was discarded, the ether phase was dried over sodium sulfate and the ether was distilled off. The residue consisted of 6.6 gm. (76% of theory) of N-10'-cyanodecyl-4-phenyl-piperidinol-(4) of the formula

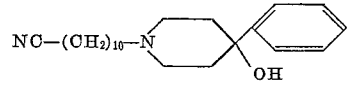

3 gm. of this raw base were dissolved in ether, and hydrogen chloride gas was bubbled through the solution. The hydrochloride of the base precipitated out. It was recrystallized once from ethyl acetate, whereupon it had a melting point of 104-106° C. The yield was 1.3 gm.

3.6 gm. (0.01 mol) of the raw N-10'-cyanodecyl-4-phenyl-piperidinol-(4) were dissolved in 15 cc. benzene, and the solution was admixed with 4 cc. acetyl chloride. The resulting mixture was refluxed for one hour. Thereafter, the benzene solvent was distilled off and the residue was recrystallized from acetone, yielding 0.9 gm. (21% of theory) of N-10'cyanodecyl-4-phenyl-4-acetoxy-piperidine hydrochloride having a melting point of 169-170° C. and the structural formula

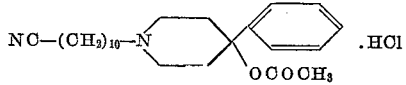

EXAMPLE XIV

*Preparation of N-(N'-γ-Cyanopropyl-Methylamino)-Ethyl-4-Phenyl-4-Acetoxy-Piperidine Dihydrochloride by Method A*

10.0 gm. (0.056 mol) of 4-phenyl-piperidinol-(4) were reacted with 16 gm. (γ-cyanopropyl-methylamino)-ethyl chloride in a manner analogous to that described in Example I, yielding 20 gm. of N-(N'-γ-cyanopropyl-methylamino)-ethyl-4-phenyl-piperidinol-(4) (M.P. 234-236° C.) which was then esterified with acetyl chloride under conditions analogous to those described in Example IV. 17.1 gm. (77% of theory) of raw N-(N'-γ-cyanopropylmethylamino)-ethyl-4-phenyl-4-acetoxy-piperidine dihydrochloride of the formula

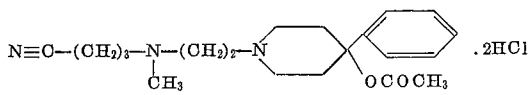 .2HCl were obtained. Upon recrystallization from ethanol the product had a melting point of 224–226° C.

The compounds according to the present invention, that is, those embraced by Formulas I and Ia and their physiologically non-toxic acid addition salts, are pharmacologically useful in that they exhibit very effective analgesic properties while their side effects are relatively low, particularly with respect to nausea and vomiting, which are usually very pronounced side effects of morphine or other strong analgesics derived from morphine as well as of the structurally related known analgesic meperidine (N-methyl-4-phenyl-4-carbethoxy-piperidine hydrochloride) of the formula

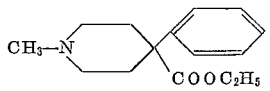

(see The Merck Index, 7th Edition, page 646). Moreover, the compounds of the present invention do not produce any significant respiratory depression at therapeutically effective doses.

The analgesic activity of the compounds according to the present invention was tested in white mice and compared with the analgesic activity of morphine and meperidine in the same test animals under the same conditions. The testing procedure employed for this purpose was that of F. Haffner, Deutsche Medizinsche Wochenschrift, vol. 54, pages 731–733 (1929). The individual compounds to be investigated were subcutaneously injected. The table below shows the results obtained from these comparative tests, the analgesic activity being expressed in terms of relative intensity based on the analgesic activity of morphine being 1. The table also shows the $ED_{50}$ (graphically determined) of all but one of the compounds in question, that is, the dose which causes central analgesia in 50% of the test animals.

TABLE

| Compound | $ED_{50}$ Mice, S.C. | Relative Analgesic Activity in Comparison with Morphine |
|---|---|---|
| | Mg./kg. | |
| Morphine | 16 | 1 |
| Meperidine | | 0.14 |
| N-6'-cyanohexyl-4-phenyl-4-acetoxy-piperdine hydrochloride | 1.12 | 14.5 |
| N-6'-cyanohexyl-3-methyl-4-phenyl-4-acetxy-piperidine hydrochloride | 0.32 | 50 |
| N - 6' - cyanohexyl - 4- phenyl - 4 - propionoxy - piperidine hydrochloride | 0.45 | 35 |
| N - 8' - cyanooctyl - 4 - phenyl - 4 - acetoxy - piperidine hydrochloride | 2.3 | 7 |
| N - 7' - cyanoheptyl - 4 - phenyl - 4 - acetoxy - piperidine hydrochloride | 2.65 | 6 |
| N - 9' - cyanononyl - 4 - phenyl - 4 - acetoxy - piperidine hydrochloride | 8.4 | 1.9 |
| N - 4' - (ω - cyanobutoxy) - butyl - 4 - phenyl - 4 - acetoxy-piperidine hydrochloride | 16.5 | 1 |
| N - 5' - cyanopentyl - 4 - phenyl - 4 - acetoxy - piperidine hydrochloride | 21 | 0.8 |

The results obtained from the comparative tests clearly show that the compounds according to the present invention are surprisingly more effective analgesics than either morphine or meperidine.

For therapeutic application the compounds according to the present invention are administered in single doses of 5–10 mgm. in the form of suitable dosage-form compositions, such as tablets, injectable solutions, suppositories and the like. The following are illustrative examples of such dosage-form compositions:

(1) *1 cc. ampules.*—Each ampule contains 1 cc. of an injectable solution composed of:

| | | |
|---|---|---|
| N - 6'-cyanohexyl - 4 - phenyl - 4 - acetoxy-piperidine hydrochloride | gm | 0.005 |
| Sodium chloride | gm | 0.007 |
| Hydrochloric acid (0.01N) | cc | 0.0033 |
| Distilled water, q.s. ad | cc | 1.0000 |

(2) *Tablets.*—Each tablet contains:

| | | |
|---|---|---|
| N - 6' - cyanohexyl - 4 - phenyl-4-acetoxy-piperidine hydrochloride | gm | 0.0100 |
| Lactose | gm | 0.0780 |
| Corn starch | gm | 0.0560 |
| Stearic acid | gm | 0.001 |
| Talcum | gm | 0.009 |
| Finely dispersed $SiO_2$ | gm | 0.006 |
| Total weight of tablet | gm | 0.1600 |

(3) *Suppositories for adults.*—Each suppository contains:

| | | |
|---|---|---|
| N - 6' - cyanohexyl - 4 - phenyl - 4 - acetoxy-piperidine hydrochloride | gm | 0.005 |
| Lactose | gm | 0.045 |
| Suppository base mass | gm | 1.600 |
| Total weight | gm | 1.650 |

Obviously, the above examples of suitable dosage-form compositions are merely illustrative. Any other compound embraced by Formulas I and Ia or a non-toxic acid addition salt thereof may be substituted as the active ingredient in place of N-6'-cyanohexyl-4-phenyl-4-acetoxy-piperidine hydrochloride in the composition above. Moreover, it will be readily apparent that the active ingredient content may be varied within the above indicated preferred limits to suit particular requirements and situations.

While we have illustrated our invention with the aid of certain specific embodiments thereof, it will be apparent to those skilled in the art that our invention is not limited to those embodiments and that various changes and modifications may be made without departing from the spirit of the invention or the scope of the appended claims.

We claim:
1. A compound selected from the group consisting of substituted piperidines having a structural formula selected from the group consisting of

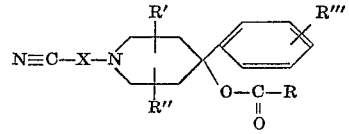

and

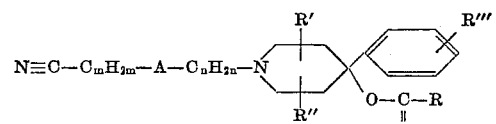

wherein

R is lower alkyl,

R' and R" are selected from the group consisting of hydrogen and lower alkyl,

R''' is selected from the group consisting of hydrogen, lower alkyl and lower alkanoyl, X is selected from the group consisting of saturated and unsaturated bivalent linear hydrocarbons containing 4 to 10 carbon atoms, inclusive, A is selected from the group consisting of oxygen, sulfur, —NH— and —N(low alkyl)—, $m$ is an integer from 2 to 8, inclusive,
$n$ is an integer from 2 to 8, inclusive,
and the sum of
$m+n$ is an integer from 4 to 10, inclusive, and their non-toxic pharmacologically acceptable acid addition salts.

2. N - 6' - cyanohexyl-4-phenyl-4-acetoxy-piperidine hydrochloride.

3. N - 6' - cyanohexyl-3-methyl-4-phenyl-4-acetoxy-piperidine hydrochloride.

4. N - 6'-cyanohexyl-4-phenyl-4-propionoxy-piperidine hydrochloride.

5. N - 8' - cyanooctyl-4-phenyl-4-acetoxy-piperidine hydrochloride.

6. N - 7' - cyanoheptyl-4-phenyl-4-acetoxy-piperidine hydrochloride.

7. N - 9' - cyanononyl-4-phenyl-4-acetoxy-piperidine hydrochloride.

8. N - 4' - (ω-cyanobutoxy)-butyl-4-phenyl-4-acetoxy-piperidine hydrochloride.

9. N - 5' - cyanopentyl-4-phenyl-4-acetoxy-piperidine hydrochloride.

No references cited.